(12) United States Patent
Voss

(10) Patent No.: US 8,511,013 B2
(45) Date of Patent: Aug. 20, 2013

(54) WIND TURBINE TOWER AND SYSTEM AND METHOD FOR FABRICATING THE SAME

(75) Inventor: Stefan Voss, Salzbergen (DE)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 12/553,395

(22) Filed: Sep. 3, 2009

(65) Prior Publication Data

US 2010/0132282 A1 Jun. 3, 2010

(51) Int. Cl.
*E04C 5/08* (2006.01)

(52) U.S. Cl.
USPC .......................................... 52/223.5; 52/848

(58) Field of Classification Search
USPC .............. 52/223.5, 742.14, 745.17, 831, 848, 52/223.14
See application file for complete search history.

(56) References Cited

U.S. PATENT DOCUMENTS

| 909,299 | A | * | 1/1909 | Hilborn et al. ............. 52/745.15 |
| 4,150,475 | A | * | 4/1979 | Bondpers et al. ............. 29/469 |
| 4,910,940 | A | * | 3/1990 | Grady, II ...................... 52/849 |
| 5,218,810 | A | * | 6/1993 | Isley, Jr. ...................... 52/834 |
| 5,599,599 | A | * | 2/1997 | Mirmiran et al. ........... 428/36.3 |
| 6,082,063 | A | * | 7/2000 | Shrive et al. ............... 52/223.13 |
| 6,123,485 | A | * | 9/2000 | Mirmiran et al. ............ 405/252 |
| 6,305,140 | B1 | * | 10/2001 | Knight ............................. 52/834 |
| 6,408,575 | B1 | * | 6/2002 | Yoshida et al. ................... 52/40 |
| 6,467,233 | B1 | * | 10/2002 | Maliszewski et al. ......... 52/831 |
| 6,532,700 | B1 | * | 3/2003 | Maliszewski et al. ............ 52/40 |
| 6,811,861 | B2 | * | 11/2004 | Bank et al. .................. 428/297.4 |
| 6,851,231 | B2 | * | 2/2005 | Tadros et al. ................ 52/223.4 |
| 6,938,392 | B2 | * | 9/2005 | Fouad et al. ..................... 52/834 |
| 7,253,786 | B1 | * | 8/2007 | Logozzo ....................... 343/890 |
| 7,445,405 | B2 | * | 11/2008 | Yurkevich ..................... 405/239 |
| 7,739,843 | B2 | * | 6/2010 | Cortina-Cordero .......... 52/223.5 |
| 7,752,825 | B2 | * | 7/2010 | Wobben .......................... 52/848 |
| 7,762,041 | B1 | * | 7/2010 | Wawrzeniak ................... 52/848 |
| 7,765,766 | B2 | * | 8/2010 | Gomez et al. .............. 52/745.04 |
| 7,770,343 | B2 | * | 8/2010 | Montaner Fraguet et al. ............................ 52/223.5 |
| 2003/0000165 | A1 | * | 1/2003 | Tadros et al. ................ 52/223.4 |
| 2004/0071372 | A1 | * | 4/2004 | Osmun et al. ................... 384/36 |
| 2005/0183381 | A1 | * | 8/2005 | Rosenberg ................... 52/721.2 |
| 2005/0223673 | A1 | * | 10/2005 | Cadwell et al. .............. 52/721.4 |
| 2006/0013516 | A1 | * | 1/2006 | Osmun et al. ................... 384/36 |
| 2006/0225379 | A1 | * | 10/2006 | Seidel et al. ................. 52/726.3 |
| 2006/0272244 | A1 | * | 12/2006 | Jensen ......................... 52/223.5 |
| 2007/0163470 | A1 | * | 7/2007 | Chanut et al. ................. 106/724 |

(Continued)

FOREIGN PATENT DOCUMENTS

| EP | 0621381 A1 | 10/1994 |
| WO | 02094525 A1 | 11/2002 |

(Continued)

*Primary Examiner* — William Gilbert
*Assistant Examiner* — James Ference
(74) *Attorney, Agent, or Firm* — James McGinness, Esq.; Armstrong Teasdale LLP

(57) ABSTRACT

A system and method for fabricating a wind turbine tower is provided. The method includes providing at least one fiber reinforced plastic ("FRP") strand, embedding a first portion of the FRP strand into a first concrete segment, and embedding a second portion of the FRP strand into a second concrete segment such that a third portion of the FRP strand extends from the first concrete segment to the second concrete segment. The method further includes displacing at least one of the first concrete segment and the second concrete segment relative to the other such that a tension is applied to the third portion of the FRP strand.

5 Claims, 9 Drawing Sheets

(56) References Cited

U.S. PATENT DOCUMENTS

2008/0040983 A1* 2/2008 Gomez et al. ............ 52/40
2008/0184654 A1* 8/2008 Polyzois et al. ......... 52/651.01
2008/0209842 A1 9/2008 Montaner Fraguet et al.
2008/0236073 A1* 10/2008 Bagepalli et al. .......... 52/292
2009/0031639 A1* 2/2009 Cortina/Cordero ........... 52/40

FOREIGN PATENT DOCUMENTS

| WO | 2004017330 A1 | 2/2004 |
| WO | 2004097134 A2 | 11/2004 |
| WO | WO 2006111597 A1 * | 10/2006 |

* cited by examiner

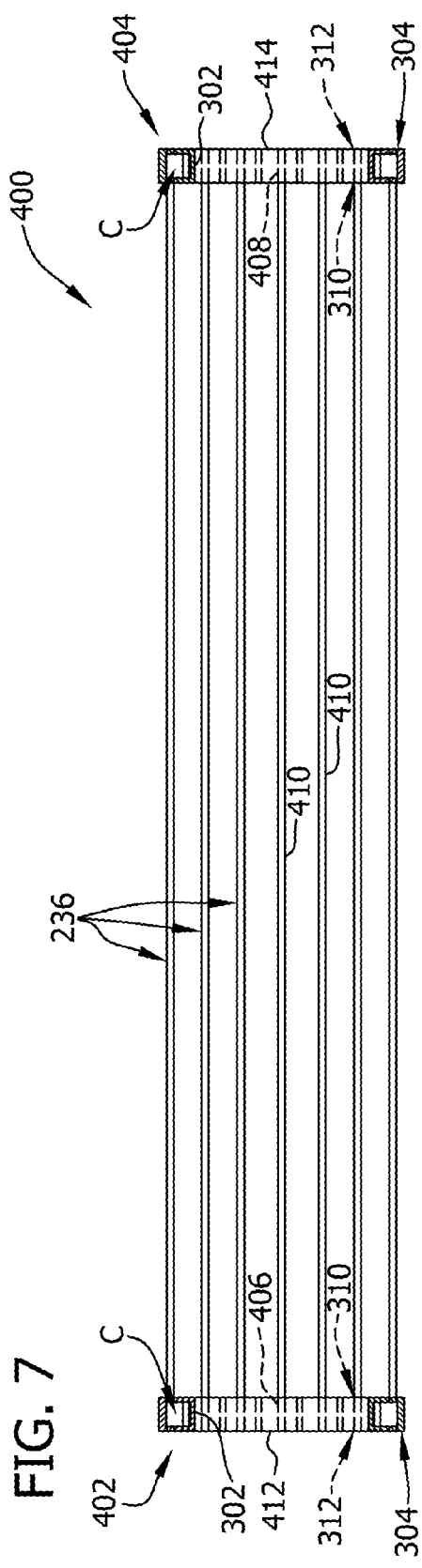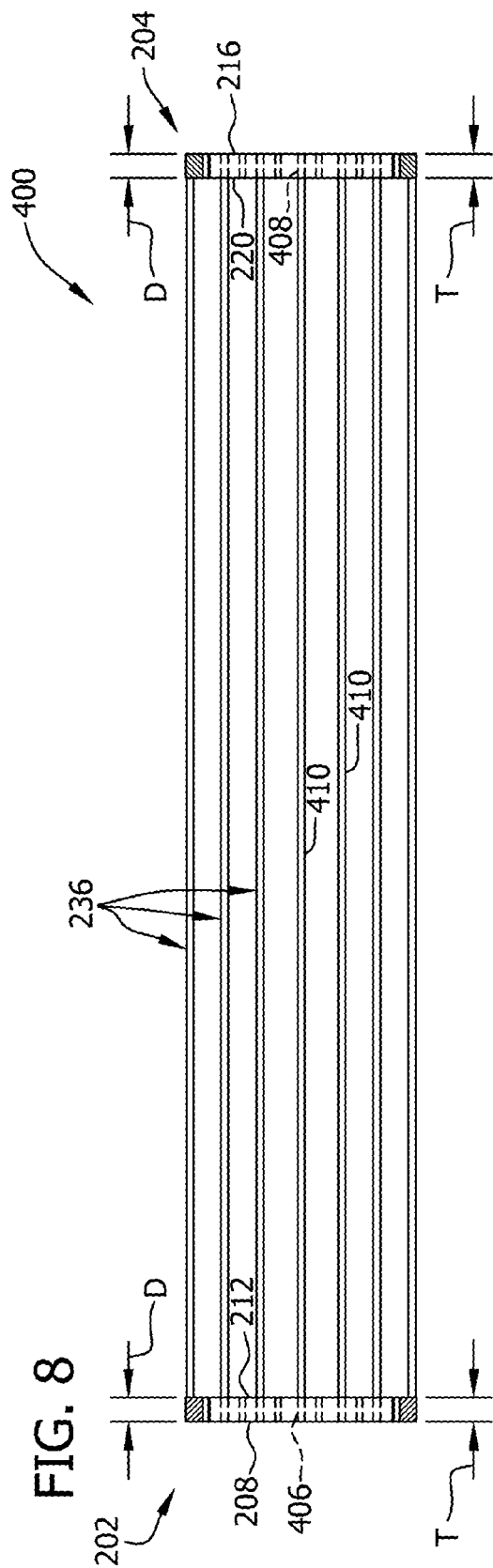

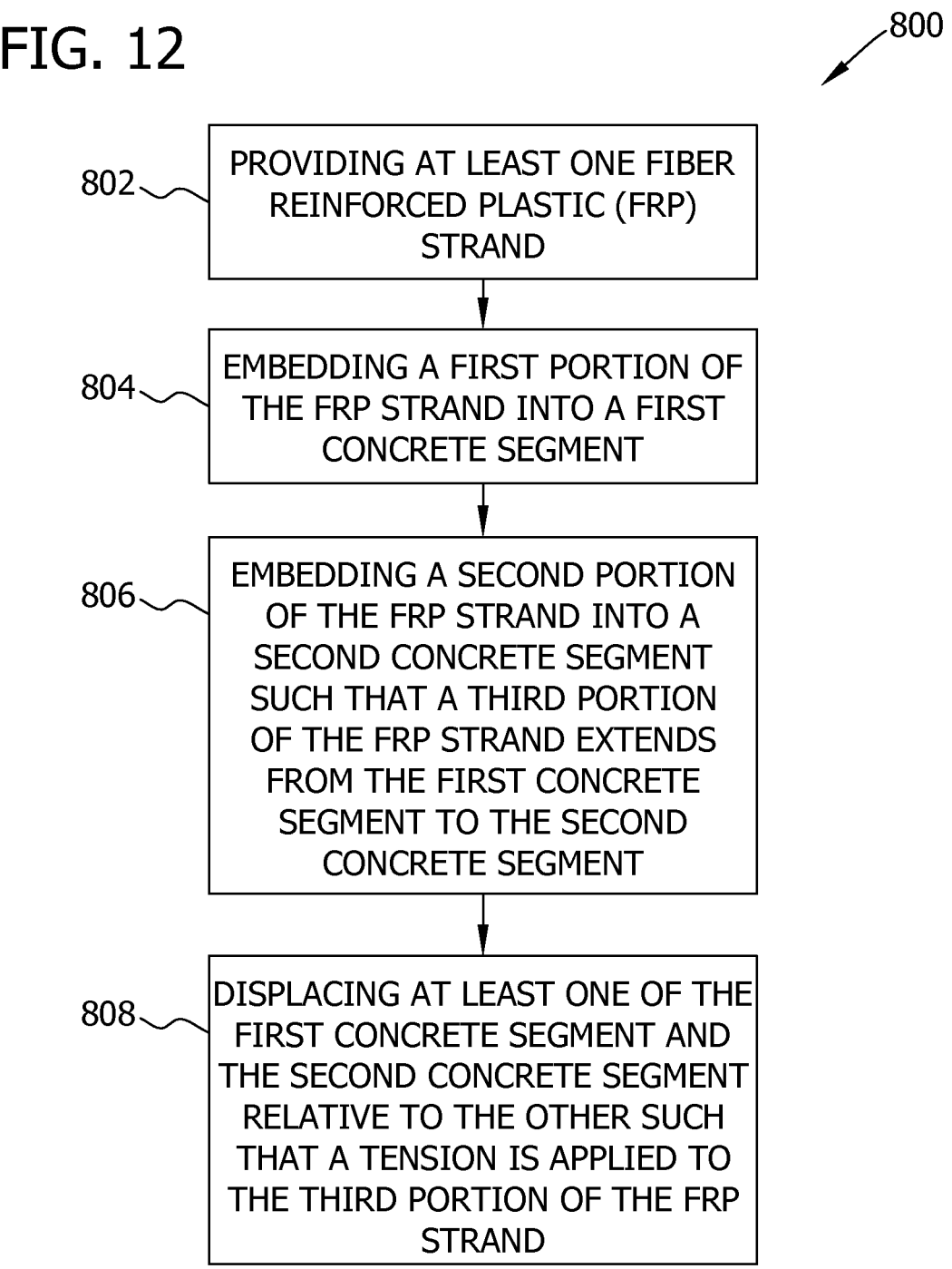

US 8,511,013 B2

WIND TURBINE TOWER AND SYSTEM AND METHOD FOR FABRICATING THE SAME

BACKGROUND OF THE INVENTION

The subject matter described herein relates generally to wind turbines and, more particularly, to a wind turbine tower and a system and method for fabricating or making a wind turbine tower.

Many known wind turbines include a tower and a rotor mounted on the tower via a nacelle. The rotor includes a number of blades that facilitate converting wind energy into rotational energy. The rotor drives a generator through a gearbox via a rotor shaft, and the gearbox steps up the inherently low rotational speed of the rotor shaft such that the generator can convert the mechanical energy to electrical energy.

Because many known wind turbines are subjected to harsh environmental conditions, wind turbine towers are often reinforced (e.g., with steel) to facilitate increasing the structural integrity of the wind turbine. However, at least some wind turbines are utilized in wet environments (e.g., offshore wind farms), and the increased moisture has been known to contribute to corrosion of the wind turbine towers and/or the wind turbine tower reinforcements. As such, it would be useful to provide a wind turbine tower that is less susceptible to corrosion while maintaining the structural integrity of the wind turbine tower, thereby increasing the useful life of the wind turbine.

BRIEF DESCRIPTION OF THE INVENTION

In one aspect, a method for fabricating a wind turbine tower is provided. The method includes providing at least one fiber reinforced plastic ("FRP") strand, embedding a first portion of the FRP strand into a first concrete segment, and embedding a second portion of the FRP strand into a second concrete segment such that a third portion of the FRP strand extends from the first concrete segment to the second concrete segment. The method further includes displacing at least one of the first concrete segment and the second concrete segment relative to the other such that a tension is applied to the third portion of the FRP strand.

In another aspect, a wind turbine tower including a plurality of tower sections is provided. At least one of the tower sections includes a first concrete segment, a second concrete segment formed separately from the first concrete segment, and a third concrete segment formed separately from the first concrete segment and the second concrete segment. The third concrete segment is positioned between the first concrete segment and the second concrete segment.

In another aspect, a system for fabricating a wind turbine tower section is provided. The system includes a first flange formwork and a second flange formwork. Each of the first flange formwork and the second flange formwork defines an annular cavity and a first aperture configured to permit access to the cavity. The system also includes a wall formwork including an inner form and an outer form. The wall formwork is configured to be coupled between the first flange formwork and the second flange formwork such that the first aperture of the first flange formwork and the first aperture of the second flange formwork are oriented toward one another between the inner form and the outer form.

BRIEF DESCRIPTION OF THE DRAWINGS

FIG. 7 is a sectional view of a skeleton of the tower section shown in FIG. 2 during fabrication using the formwork shown in FIG. 5;

FIG. 8 is a sectional view of the skeleton shown in FIG. 7 after concrete has been added into the formwork shown in FIG. 5 and the formwork shown in FIG. 5 has been removed;

FIG. 12 is a flow chart of a method for fabricating the tower section shown in FIG. 2.

DETAILED DESCRIPTION OF THE INVENTION

The following detailed description describes a system and method for fabricating or making a tower by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to an exemplary embodiment, namely, a wind turbine tower. However, it is contemplated that this disclosure has general application to towers in a broad range of systems and in a variety of applications other than wind turbines.

Figure 1:
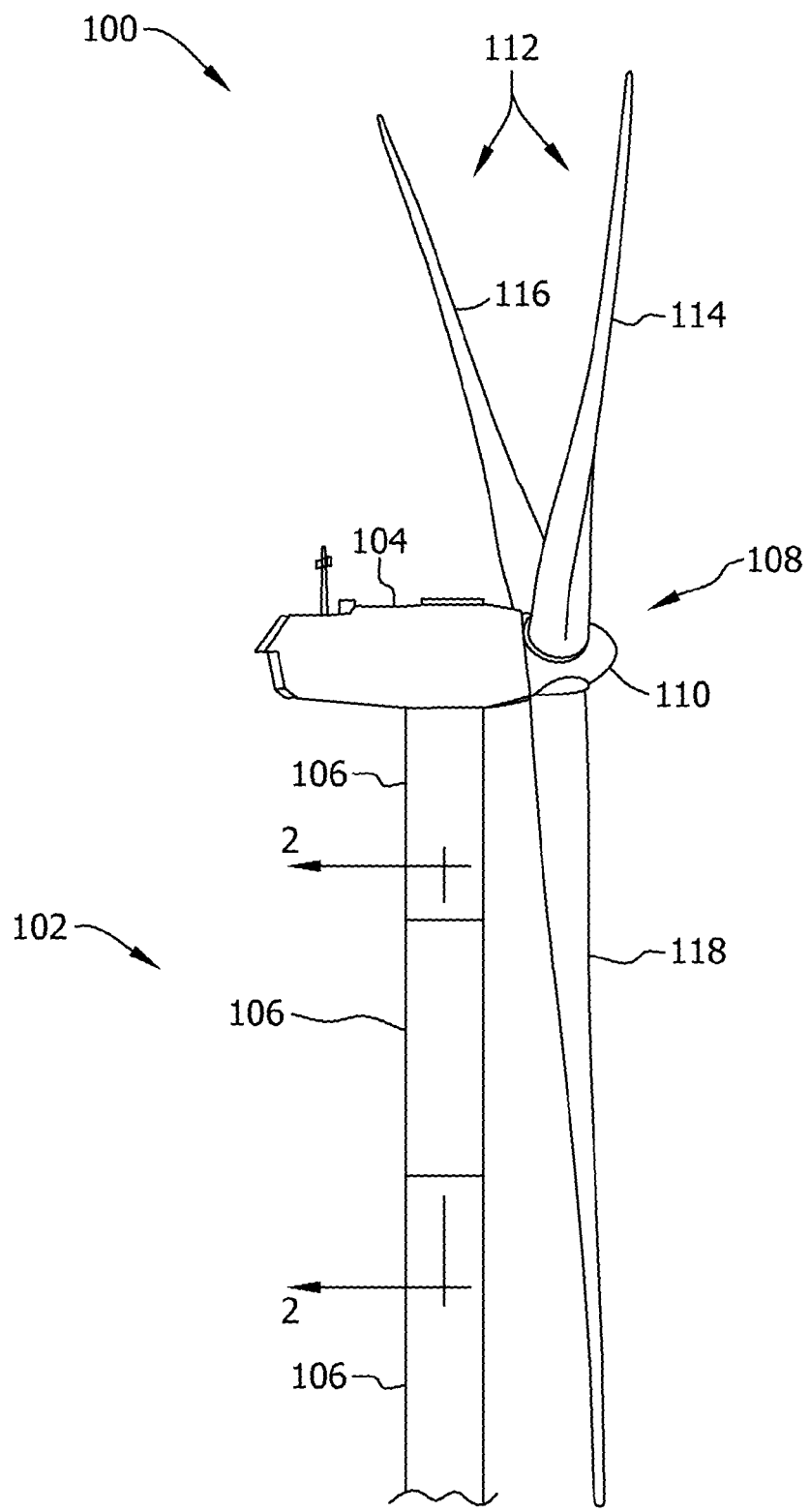
FIG. 1 is a side elevation view of a wind turbine.

FIG. 1 is a side elevation view of an exemplary wind turbine 100. In the exemplary embodiment, wind turbine 100 is a horizontal axis wind turbine. Alternatively, wind turbine 100 may be a vertical axis wind turbine. Wind turbine 100 includes a tower 102 erected from a foundation (not shown), a nacelle 104 mounted on tower 102, and a rotor 108 rotatably coupled to nacelle 104. Tower 102 includes a plurality of tower sections 106 that are stacked atop of one another and are coupled together using a suitable coupler or fastener, such as a plurality of bolts, for example. In one embodiment, tower sections 106 are substantially similar (e.g., are fabricated from substantially similar processes, as described below). In other embodiments, tower sections 106 may not be substantially similar.

In the exemplary embodiment, rotor 108 includes a rotatable hub 110 and a plurality of rotor blades 112 coupled to and extending outwardly from hub 110. In the exemplary embodiment, rotor blades 112 include a first rotor blade 114, a second rotor blade 116, and a third rotor blade 118. In other embodiments, rotor 108 may include any suitable number of rotor blades 112. In the exemplary embodiment, rotor blades 112 are equidistantly spaced about hub 110 to facilitate enabling kinetic energy of the wind to be converted into rotational energy and, subsequently, into electrical energy. Alternatively, rotor blades 112 may be spaced any suitable distance from one another about hub 110.

Figure 2:
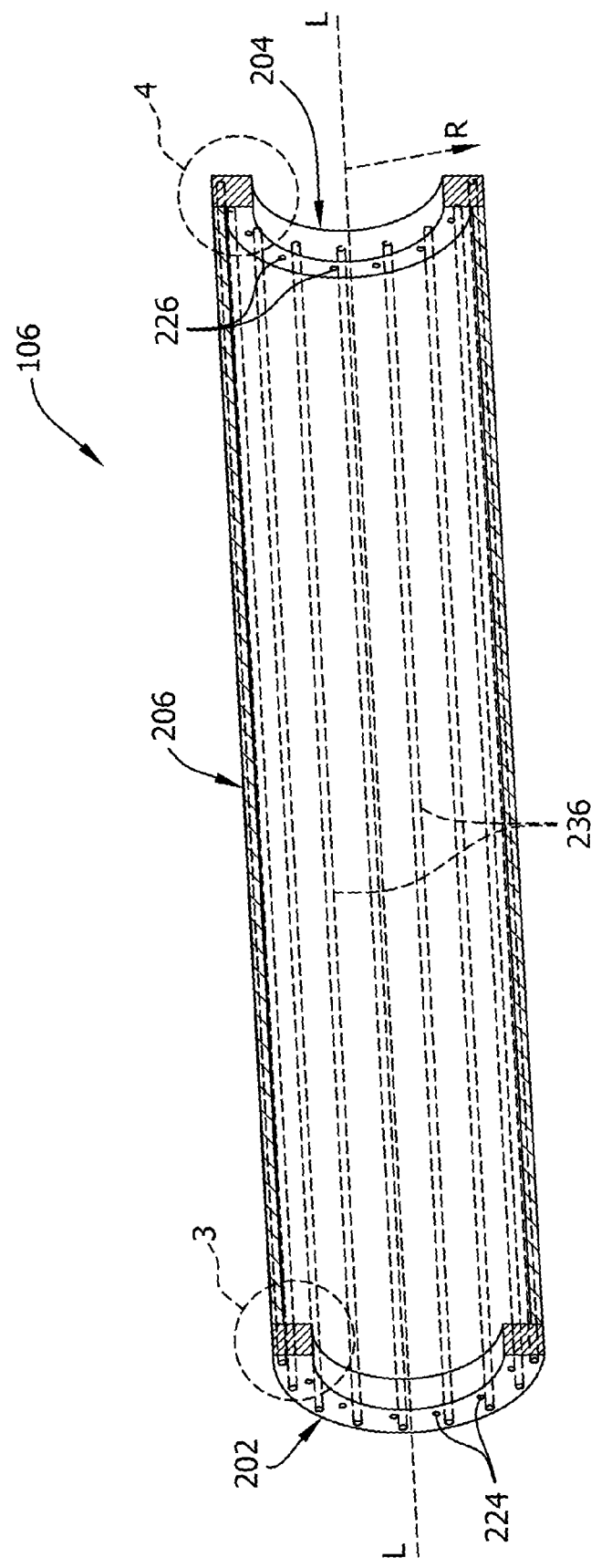
FIG. 2 is an enlarged sectional view of a tower section of the wind turbine shown in FIG. 1 and taken along sectional line 2-2.
Figure 3:
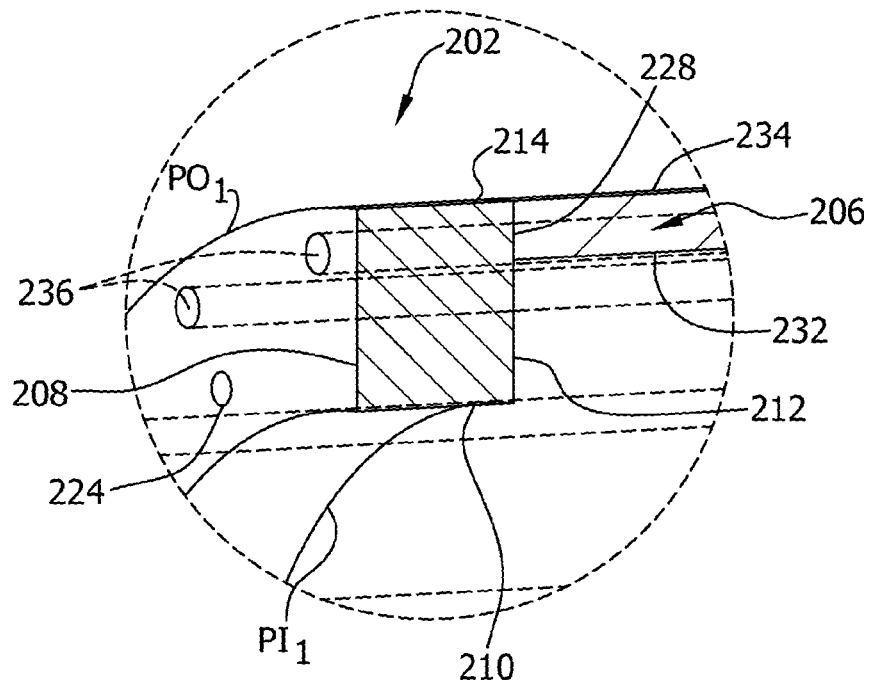
FIG. 3 is an enlarged portion of the tower section shown in FIG. 2.
Figure 4:
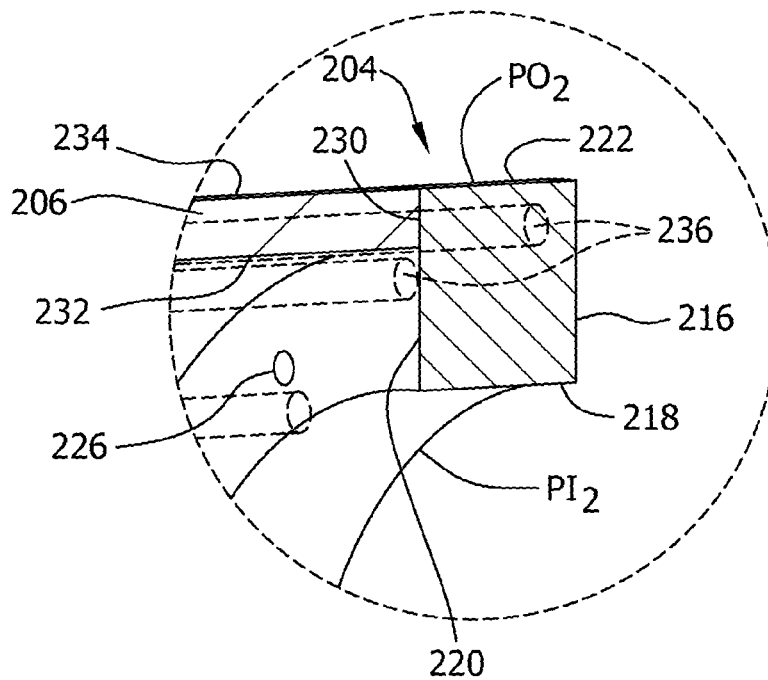
FIG. 4 is an enlarged portion of the tower section shown in FIG. 2.

FIG. 2 is an enlarged sectional view of tower section 106 shown in FIG. 1 and taken along sectional line 2-2. FIG. 3 is an enlarged portion of tower section 106 as shown in FIG. 2. FIG. 4 is another enlarged portion of tower section 106 as shown in FIG. 2. In the exemplary embodiment, tower section 106 has a longitudinal axis L and a radius R, and tower section 106 includes a first segment (e.g., a first flange 202), a second segment (e.g., a second flange 204), and a third segment (e.g., a wall section 206) extending from the first segment to the second segment along longitudinal axis L. In one embodiment, tower section 106 is generally cylindrical. In other embodiments, tower section 106 may have any suitable size and/or shape (e.g., tower section 106 may be tapered).

In the exemplary embodiment, first flange 202 is annular and includes a first mating surface 208, a first inner surface 210 adjacent first mating surface 208, a first support surface 212 adjacent first inner surface 210, and a first outer surface 214 between first mating surface 208 and first support surface 212, forming a substantially quadrilateral (e.g., rectangular) cross-section of first flange 202. Similarly, second flange 204 is annular and includes a second mating surface 216, a second inner surface 218 adjacent second mating surface 216, a second support surface 220 adjacent second inner surface 218, and a second outer surface 222 between second mating surface 216 and second support surface 220, forming a substantially quadrilateral (e.g., rectangular) cross-section of second flange 204. First flange 202 has a first inner perimeter $PI_1$ defined by first inner surface 210 and a first outer perimeter $PO_1$ defined by first outer surface 214, and second flange 204 has a second inner perimeter $PI_2$ defined by second inner surface 218 and a second outer perimeter $PO_2$ defined by second outer surface 222.

In the exemplary embodiment, first flange 202 includes a plurality of first fastener apertures 224, and second flange 204 includes a plurality of second fastener apertures 226 that facilitate fastening tower section 106 to adjacent tower sections 106 via any suitable fastener (e.g., bolts). First fastener apertures 224 extend from first support surface 212 through first mating surface 208 in a predetermined pattern (e.g., a circumferential pattern in the exemplary embodiment) about first flange 202, and second fastener apertures 226 extend from second support surface 220 through second mating surface 216 in a predetermined pattern (e.g., a circumferential pattern in the exemplary embodiment) about second flange 204. In some embodiments, first fastener apertures 224 and/or second fastener apertures 226 may be arranged in any suitable pattern. In other embodiments, first flange 202 and/or second flange 204 may not include first fastener apertures 224 and/or second fastener apertures 226, respectively. In the exemplary embodiment, first flange 202 and second flange 204 are fabricated from an ultra-high performance concrete ("UHPC"). As used herein, the term "ultra-high performance concrete" (or "UHPC") refers to a concrete material that has improved compression strength, tensile strength, and/or ductility over conventional concrete materials. In one embodiment, the UHPC has a compression strength of between about 150 megapascals and about 300 megapascals and a tensile strength of between about 15 megapascals and 30 megapascals. In other embodiments, the UHPC may have any suitable compression strength, tensile strength, and/or ductility that facilitates enabling the UHPC to function as described herein. Alternatively, first flange 202 and/or second flange 204 may be fabricated from any suitable material that enables tower section 106 to function as described herein, including, without limitation, another suitable concrete material.

In the exemplary embodiment, wall section 206 includes a first end surface 228, a second end surface 230, an interior surface 232, and an exterior surface 234. First end surface 228 is seated against first support surface 212 of first flange 202 adjacent first outer perimeter $PO_1$ such that first fastener apertures 224 (i.e., the circumferential pattern of first fastener apertures 224) are disposed radially between interior surface 232 of wall section 206 and first inner surface 210. Similarly, second end surface 230 is seated against second support surface 220 of second flange 204 adjacent second outer perimeter $PO_2$ such that second fastener apertures 226 (i.e., the circumferential pattern of second fastener apertures 226) are disposed radially between interior surface 232 and second inner surface 218. In other embodiments, wall section 206 may have any suitable radial positioning relative to first flange 202 and/or second flange 204 (e.g., wall section 206 may be positioned such that first fastener apertures 224 and/or second fastener apertures 226 are disposed between wall section 206 and outer surface 214 of flange 202 and/or outer surface 222 of flange 204). In the exemplary embodiment, wall section 206 is fabricated from a concrete material. In one embodiment, the concrete material of wall section 206 is different in composition than the UHPC of first flange 202 and/or second flange 204. In other embodiments, the concrete material of wall section 206 may be at least substantially the same as the UHPC of first flange 202 and/or second flange 204. Alternatively, wall section 206 may be fabricated from any suitable material that enables tower section 106 to function as described herein.

In the exemplary embodiment, wall section 206 includes a plurality of pre-stressed, fiber reinforced plastic ("FRP") strands 236 (e.g., carbon fiber reinforced plastic ("CFRP") strands) embedded therein. FRP strands 236 extend through wall section 206 along longitudinal axis L from first flange 202 to second flange 204 such that each FRP strand 236 extends through first support surface 212 into first flange 202 and/or through second support surface 220 and into second flange 204. In the exemplary embodiment, FRP strands 236 are directly bonded to the concrete material of wall section 206 and are directly bonded to the UHPC of first flange 202 and second flange 204. As used herein, the term "directly bonded" is defined as being in contact therewith and having no barrier or buffer therebetween. In other embodiments, FRP strands 236 may have any suitable engagement with first flange 202, second flange 204, and/or wall section 206 (e.g., an intermediate material may be disposed between FRP strands 236 and first flange 202, second flange 204, and/or wall section 206).

Figure 5:
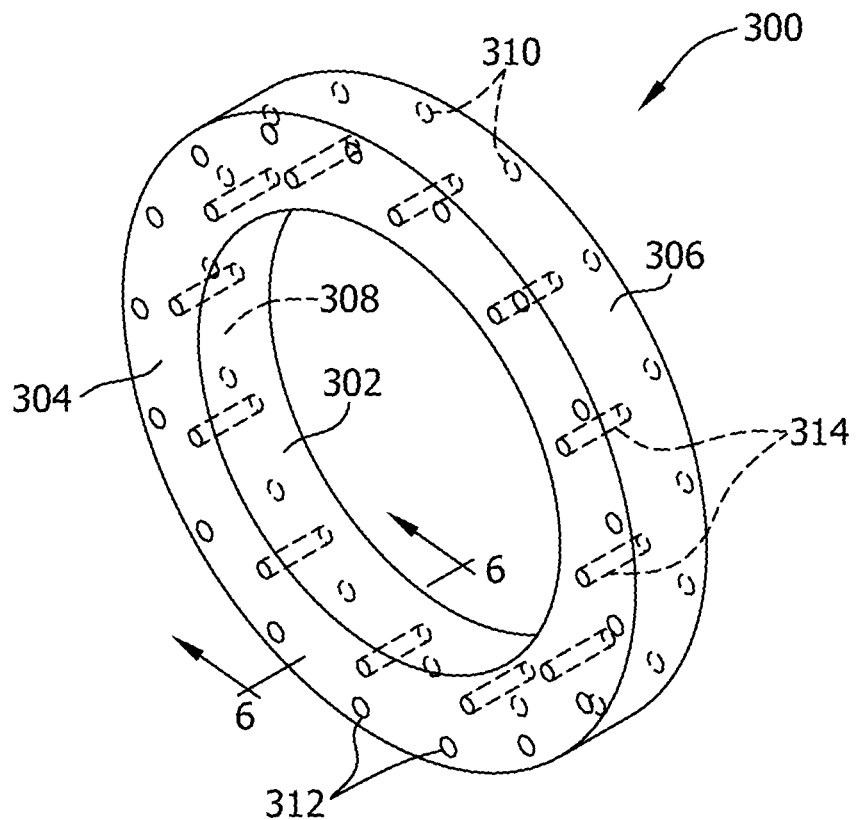
FIG. 5 is a perspective view of a formwork for use in fabricating the tower section shown in FIG. 2.
Figure 6:
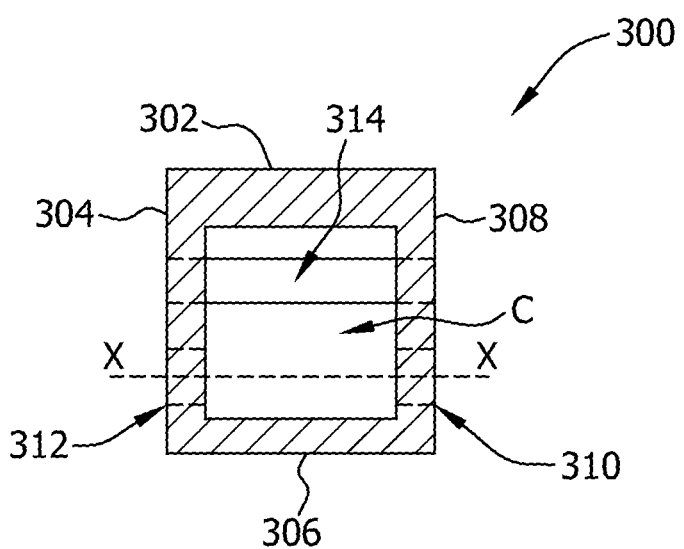
FIG. 6 is a sectional view of the formwork shown in FIG. 5 and taken along sectional line 6-6.

FIG. 5 is a perspective view of a flange formwork 300 suitable for use in fabricating first flange 202 and/or second flange 204. FIG. 6 is a sectional view of flange formwork 300 taken along sectional line 6-6. In the exemplary embodiment, flange formwork 300 is formed from an annular, wooden material that includes an inner wall 302, a mating wall 304 adjacent inner wall 302, an outer wall 306 adjacent mating wall 304, and a support wall 308 between outer wall 306 and inner wall 302, forming a cavity C having a substantially quadrilateral (e.g., rectangular) cross-section sized to match the substantially quadrilateral cross-section of first flange 202 and/or second flange 204. In one embodiment, inner wall 302, mating wall 304, outer wall 306, and/or support wall 308 may be formed separately from one another and coupled together using any suitable fastener (e.g., screws, nails, and/or adhesives). In another embodiment, inner wall 302, mating wall 304, outer wall 306, and/or support wall 308 may be integrally formed together (i.e., formed from a single, continuous, and unjointed material). In some embodiments, flange formwork 300 may be formed from any suitable material and may have any suitable number of walls arranged in any suitable configuration (e.g., flange formwork 300 may have a shape other than an annular shape) that facilitates fabricating first flange 202 and/or second flange 204 as described herein having desired dimensions and/or configuration.

In the exemplary embodiment, support wall 308 includes a plurality of support wall strand apertures 310 extending therethrough, and mating wall 304 includes a plurality of mating wall strand apertures 312 extending therethrough. Support wall strand apertures 310 are arranged in a predetermined pattern (e.g., a circumferential pattern in the exemplary embodiment) about support wall 308, and mating wall strand apertures 312 are arranged in a predetermined pattern (e.g., a circumferential pattern in the exemplary embodiment) about mating wall 304 such that the circumferential pattern of mating wall strand apertures 312 substantially matches the circumferential pattern of support wall strand apertures 310 (i.e., each support wall strand aperture 310 is substantially coaxially aligned with a corresponding mating wall strand aperture 312 along an X-axis shown in FIG. 6). In the exemplary embodiment, flange formwork 300 also includes a plurality of fastener bosses 314 extending from support wall 308 to mating wall 304. Fastener bosses 314 are arranged in a circumferential pattern disposed radially between strand apertures 310, 312 and inner wall 302 (i.e., the circumferential pattern of fastener bosses 314 is positioned to generate the circumferential pattern of first fastener apertures 224 and/or second fastener apertures 226 through first flange 202 and/or second flange 204, as shown in FIG. 2).

FIGS. 7 and 8 are sectional views of a skeleton 400 suitable for use in fabricating tower section 106. In the exemplary embodiment, as shown in FIG. 7, skeleton 400 initially includes a first flange formwork 402, a second flange formwork 404, and a plurality of FRP strands 236 that extend from first flange formwork 402 to second flange formwork 404 substantially without tension. First flange formwork 402 and second flange formwork 404 are substantially similar to flange formwork 300 shown in FIG. 5, and similar components will be referenced using the same numerals of FIG. 5.

In one embodiment, a first portion 406 of each FRP strand 236 is disposed within cavity C of first flange formwork 402 by inserting each FRP strand 236 through first flange formwork 402 via one support wall strand aperture 310 and a corresponding, and substantially coaxial, mating wall strand aperture 312 and fastening each FRP strand 236 to an outer surface 412 of mating wall 304 of first flange formwork 402 (e.g., via knotting, stapling, etc.) to prevent or limit retraction of FRP strands 236 back through mating wall strand apertures 312 and/or support wall strand apertures 310. Similarly, a second portion 408 of each FRP strand 236 is disposed within cavity C of second flange formwork 404 by inserting each FRP strand 236 through second flange formwork 404 via one support wall strand aperture 310 and a corresponding, and substantially coaxial, mating wall strand aperture 312 and fastening each FRP strand 236 to an outer surface 414 of mating wall 304 of second flange formwork 404 (e.g., via knotting, stapling, etc.) to prevent or limit retraction of FRP strands 236 back through mating wall strand apertures 312 and/or support wall strand apertures 310.

With FRP strands 236 extending from first flange formwork 402 to second flange formwork 404 substantially without tension, the UHPC is added into cavity C of first flange formwork 402 and second flange formwork 404. In one embodiment, the UHPC may be injected into first flange formwork 402 and/or second flange formwork 404 via any suitable concrete injection method. In another embodiment, first flange formwork 402 and/or second flange formwork 404 may not include inner wall 302, and the UHPC may be added into first flange formwork 402 and/or second flange formwork 404 via a spinning method (i.e., to facilitate obtaining a "spun-concrete"). Alternatively, the UHPC may be added to first flange formwork 402 and/or second flange formwork 404 via any suitable method that enables formation of first flange 202 and second flange 204, respectively, from first flange formwork 402 and/or second flange formwork 404 as described herein.

In the exemplary embodiment, after the UHPC is added to first flange formwork 402 and/or second flange formwork 404, the UHPC is permitted to harden into first flange 202 and second flange 204, respectively, as shown in FIG. 8 (e.g., such that each of first flange 202 and/or second flange 204 is about 10-20 centimeters in thickness T and such that FRP strands 236 extend a distance D into and are directly bonded to the UHPC of first flange 202 and second flange 204). In one embodiment, first portion 406 of each FRP strand extends through first flange 202 from first support surface 212 to first mating surface 208, second portion 408 of each FRP strand 236 extends through second flange 204 from second support surface 220 to second mating surface 216, and a third portion 410 of each FRP strand 236 extends from first flange 202 to second flange 204. Alternatively, first flange 202 and/or second flange 204 may have any suitable thickness T, and first portion 406 and/or second portion 408 of FRP strands 236 may extend any suitable distance D into first flange 202 and/or second flange 204, respectively, that enables tower section 106 to function and/or to be fabricated as described herein. In the exemplary embodiment, after the UHPC hardens and first flange 202 and second flange 204 are formed, first flange formwork 402 and second flange formwork 404 are removed, as shown in FIG. 8. In alternative embodiments, first flange formwork 402 and/or second flange formwork 404 may remain coupled to first flange 202 and/or second flange 204, respectively, during at least one subsequent stage of fabrication of tower section 106.

Figure 9:
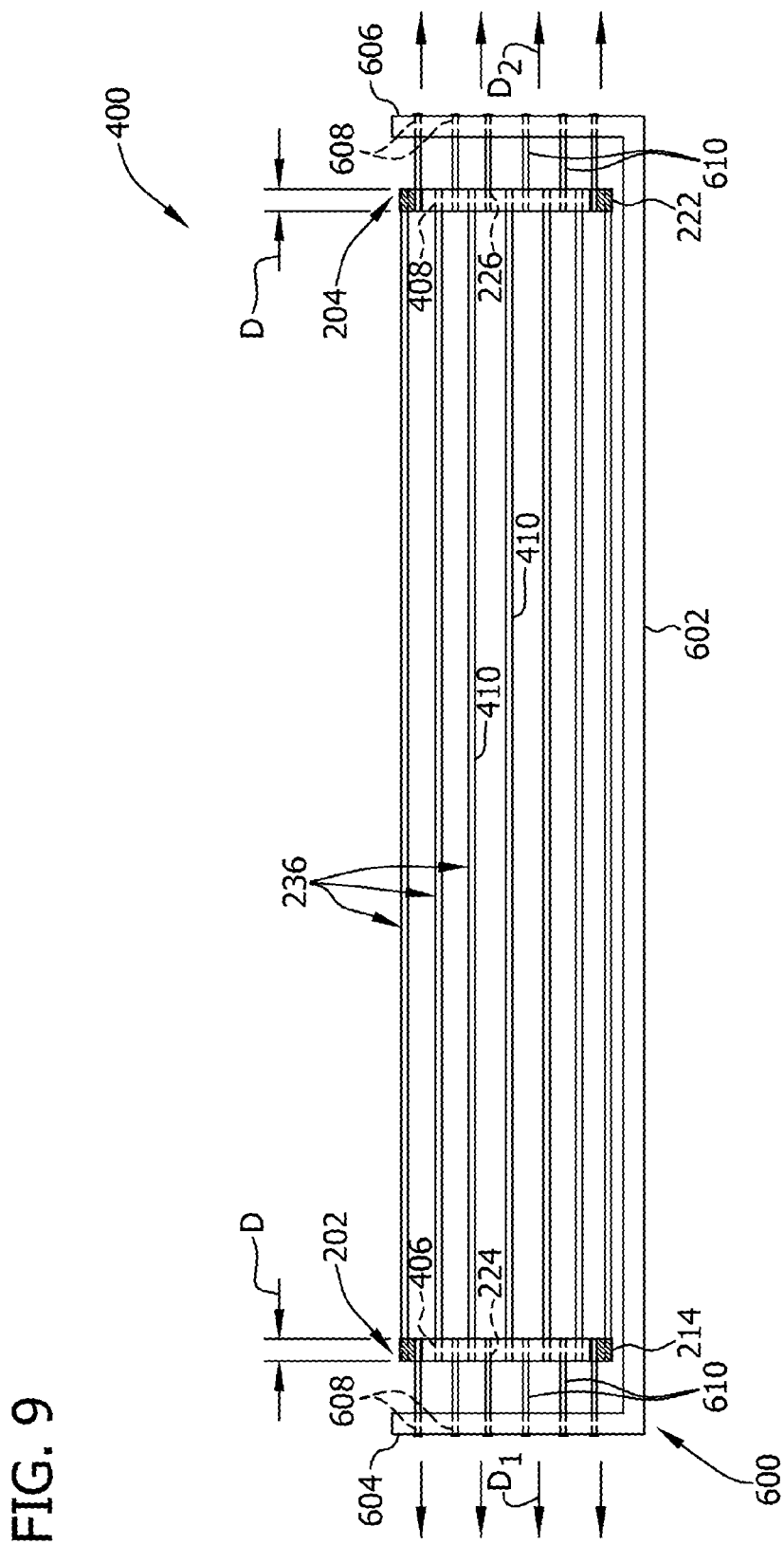
FIG. 9 is a sectional view of the skeleton shown in FIG. 8 coupled to a frame.

FIG. 9 is a sectional view of skeleton 400 during a subsequent stage of fabrication of tower section 106. In the exemplary embodiment, after first flange formwork 402 and second flange formwork 404 have been removed, skeleton 400 is inserted into a frame 600 to facilitate applying tension to FRP strands 236, as described below. Frame 600 includes a base 602, a first sidewall 604 extending outwardly from base 602, and a second sidewall 606 extending outwardly from base 602. First sidewall 604 and second sidewall 606 include a plurality of frame apertures 608 arranged in a pattern that corresponds to the pattern of first fastener apertures 224 of first flange 202 and/or second fastener apertures 226 of second flange 204 (e.g., a circumferential pattern). In the exemplary embodiment, frame 600 is fabricated from a rigid material (e.g., steel). In other embodiments, frame 600 may be fabricated from any suitable material that enables frame 600 to function as described herein.

With skeleton 400 inserted into frame 600, first outer surface 214 of first flange 202 and second outer surface 222 of second flange 204 are raised above base 602 via a plurality of fasteners 610 (e.g., bolts) that are inserted through frame apertures 608 of sidewalls 604, 606 and into fastener apertures 224, 226 of first flange 202 and second flange 204, respectively, thereby engaging first flange 202 and second flange 204. Fasteners 610 are then tightened against first sidewall 604 and second sidewall 606 to facilitate displacing first flange 202 and second flange 204, respectively, toward first sidewall 604 in a direction $D_1$ and toward second sidewall 606 in a direction $D_2$, respectively, (i.e., away from one another) thereby applying a desired tension to FRP strands 236. In the exemplary embodiment, after the desired tension is applied to FRP strands 236, first portion 406 of each FRP strand 236 has a first tension, second portion 408 of each FRP strand 236 has a second tension, and third portion 410 of each FRP strand 236 has a third tension such that the third tension is greater than the first tension and the second tension. In some embodiments, the first tension of first portion 406 and/or the second tension of second portion 408 may vary along distance D (e.g., may be substantially the same as the third tension of third portion 410 near third portion 410 and may be less than the third tension of third portion 410 away from third portion 410). In other embodiments, first portion 406, second portion 408, and/or third portion 410 of each FRP strand 236 may have any suitable tension relative to one another (e.g., may be different than one another or substantially the same as one another).

In the exemplary embodiment, the UHPC of first flange 202 and second flange 204, in combination with the direct bonding between FRP strands 236 and flanges 202, 204, facilitates providing first flange 202 and second flange 204 with an increased tensile strength (e.g., an increased ability to withstand tensile stresses without cracking). This increased tensile strength is due, at least in part, to the strength of the direct bond between the UHPC and FRP strands 236, which enables higher tensile loads to be applied to FRP strands 236 via fasteners 610 during fabrication of tower section 106 with a reduced risk of cracking first flange 202 and/or second flange 204. Additionally, because FRP strands 236 extend distance D into first flange 202 and second flange 204 (e.g., substantially completely through first flange 202 and/or second flange 204 in some embodiments), a lateral (i.e., radial) force applied to FRP strands 236 by first flange 202 and/or second flange 204 (e.g., in reaction to the tensile stress applied to FRP strands 236 upon tightening fasteners 610) is facilitated to be distributed throughout a larger portion of first flange 202 and/or second flange 204, thereby enabling higher tensile loads to be applied to FRP strands 236 during fabrication of tower section 106 without breaking FRP strands 236.

Figure 10:
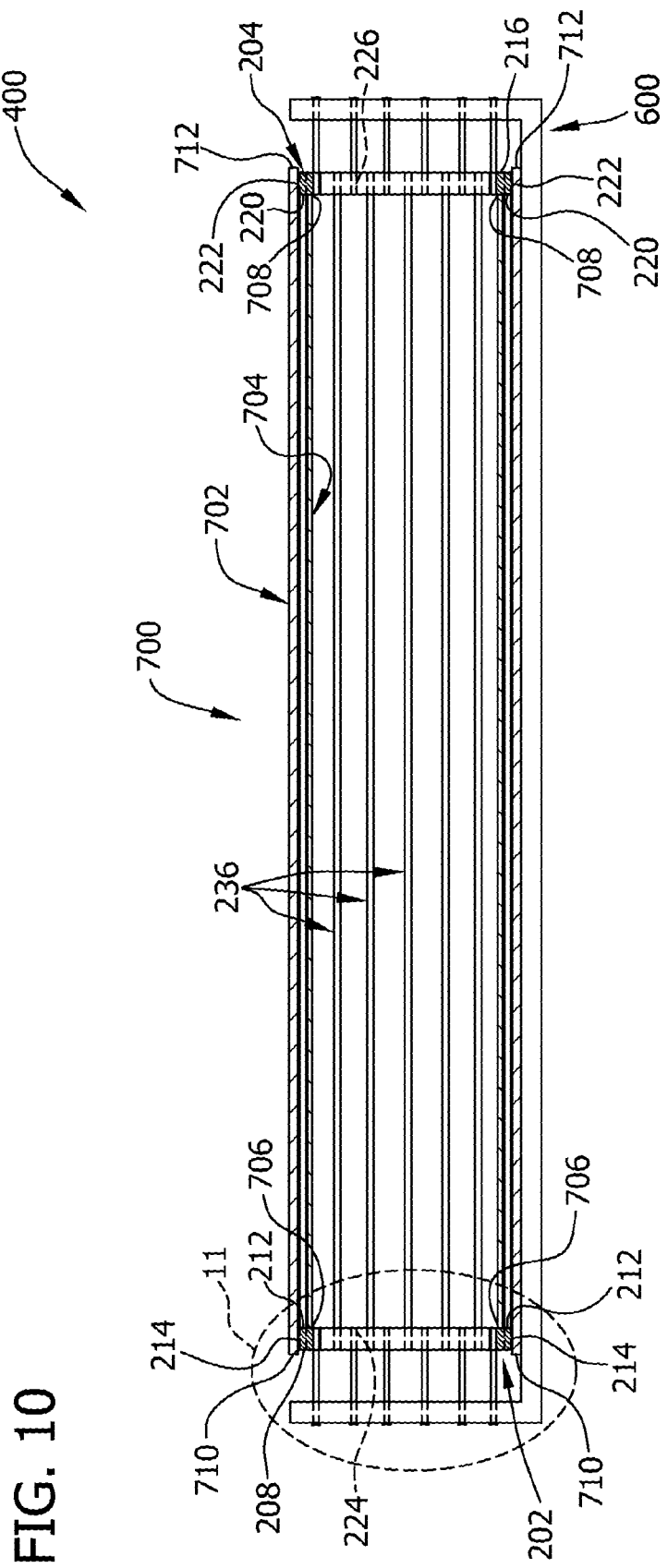
FIG. 10 is a sectional view of the skeleton shown in FIG. 8 coupled to the frame of FIG. 9 with a wall formwork coupled thereto.
Figure 11:
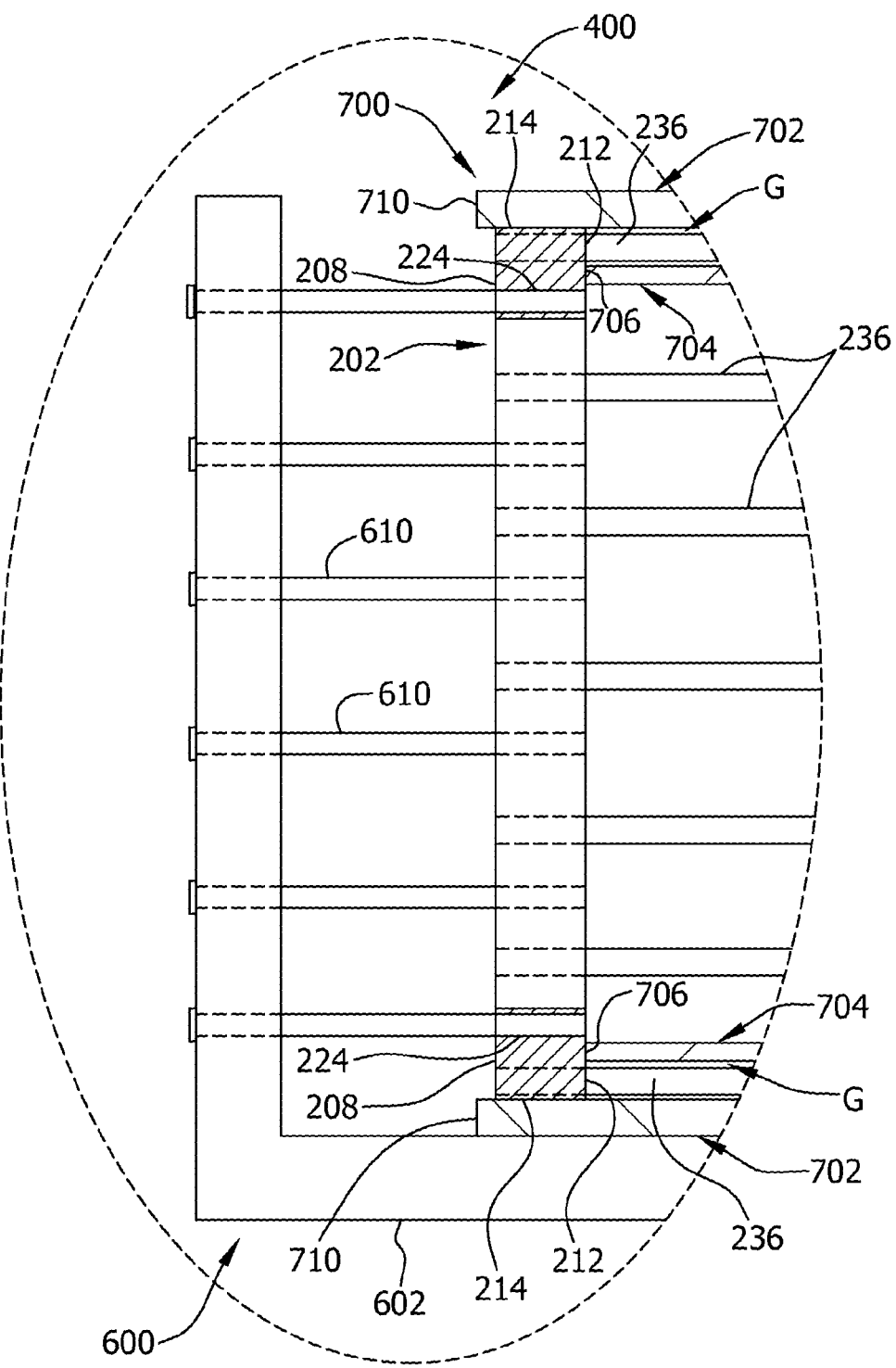
FIG. 11 is an enlarged sectional view of a portion of the skeleton and a portion of the frame shown in FIG. 10.

FIG. 10 is a sectional view of skeleton 400 inserted into frame 600 with the desired tension applied to FRP strands 236 and during a subsequent stage of fabrication of tower section 106. FIG. 11 is an enlarged sectional view of a portion of skeleton 400 and frame 600 as shown in FIG. 10. In the exemplary embodiment, after the desired tension is applied to FRP strands 236, a wall formwork 700 is coupled to first flange 202 and second flange 204. In the exemplary embodiment, wall formwork 700 includes an annular outer form 702 and an annular inner form 704. Inner form 704 includes a first end 706 and a second end 708, and outer form 702 includes a first end 710 and a second end 712. Inner form 704 is positioned between first flange 202 and second flange 204 such that inner form 704 is located radially between the circumferential patterns of fastener apertures 224, 226 and the circumferential arrangement of FRP strands 236 and such that first end 706 of inner form 704 abuts first support surface 212 of first flange 202 and second end 708 of inner form 704 abuts second support surface 220 of second flange 204. Additionally, outer form 702 is positioned radially outward of FRP strands 236 such that outer form 702 is seated on outer surfaces 214, 222 of first flange 202 and second flange 204, respectively, and such that first end 710 of outer form 702 is substantially aligned with first mating surface 208 of first flange 202 and second end 712 of outer form 702 is substantially aligned with second mating surface 216 of second flange 204.

With inner form 704 positioned radially inward of FRP strands 236 and outer form 702 positioned radially outward of FRP strands 236, a circumferential gap G is defined between inner form 704 and outer form 702, and FRP strands 236 extend longitudinally through gap G. In one embodiment, wall formwork 700 may be extendable (e.g., telescopic) to facilitate protracting and/or retracting outer form 702 and/or inner form 704 between first flange 202 and second flange 204 (e.g., to facilitate using the same wall formwork 700 during fabrication of differently sized tower sections 106 and/or to facilitate easier insertion and/or removal of wall formwork 700 from between first flange 202 and/or second flange 204). In some embodiments, inner form 704 and/or outer form 702 may be positioned at any suitable location that facilitates enabling fabrication of tower section 106 as described herein. In other embodiments, first flange formwork 402, second flange formwork 404, and/or wall formwork 700 may be a unitary structure (i.e., a single, continuous, and unjointed material) such that first flange 202, second flange 204, and/or wall section 206 are hardened before the unitary structure is removed. In one embodiment, if first flange formwork 402, second flange formwork 404, and/or wall formwork 700 are a unitary structure, a temporary wall may be provided between cavities C and gap G during the forming (e.g., pouring and hardening) of first flange 202 and/or second flange 204 to facilitate preventing a flow of the UHPC into gap G.

In the exemplary embodiment, with FRP strands 236 extending through gap G, the concrete material is added into gap G between inner form 704 and outer form 702, and the concrete material is permitted to harden, thereby forming wall section 206 (shown in FIG. 2). In the exemplary embodiment, the concrete material is added into gap G with frame 600 oriented in a substantially horizontal position (e.g., with base 602 positioned on a planar surface, such as a ground surface or a table surface). In one embodiment, the concrete material may be added into gap G via any suitable concrete injection method. In other embodiments, wall formwork 700 may not include inner form 704, and the concrete material of wall section 206 may be added via a spinning method (e.g., skeleton 400 and/or frame 600 may be spun about longitudinal axis L to facilitate obtaining a "spun-concrete"). Alternatively, the concrete material of wall section 206 may be added into gap G with frame 600 oriented in a vertical position. In the exemplary embodiment, after the concrete material of wall section 206 has hardened, inner form 704 and outer form 702 are removed. With inner form 704 and outer form 702 removed, tower section 106 is completely fabricated (as shown in FIG. 2), and tower section 106 may be removed from frame 600.

After removal from frame 600, tower section 106 may subsequently be stacked with, and/or fastened to, adjacent tower sections 106 as shown in FIG. 1 (e.g., by bolting adjacent tower sections 106 together via first fastener apertures 224 and/or second fastener apertures 226). In the exemplary embodiment, during an operation of wind turbine 100, wall section 206 and flanges 202, 204 are not bonded together but, rather, the tension applied to FRP strands 236 during fabrication of each tower section 106 and the weight of each tower section 106 atop of the other facilitate maintaining flanges 202, 204 and wall section 206 in abutment with one another (i.e., facilitate preventing flanges 202, 204 and/or wall section 206 from moving laterally relative to one another). In other embodiments, an additional fastener (e.g., a mechanical fastener and/or an adhesive fastener) may be provided to facilitate maintaining flanges 202, 204 and/or wall section 206 in proper position relative to one another during an operation of wind turbine 100. In one embodiment, a plurality of shorter, unstressed FRP strands 236 may be embedded into flanges 202, 204 and wall section 206 during fabrication of tower section 106 such that the shorter, unstressed FRP strands 236 extend between flanges 202, 204 and wall section 206 to facilitate maintaining flanges 202, 204 and wall section 206 in abutment during an operation of wind turbine 100 (e.g., to facilitate preventing flanges 202, 204 and/or wall section 206 from moving laterally relative to one another).

FIG. 12 is a flow chart of a method 800 for fabricating or making a wind turbine tower as described herein. In the exemplary embodiment, the method includes providing 802 at least one fiber reinforced plastic (FRP) strand, embedding 804 a first portion of the FRP strand into a first concrete segment, and embedding 806 a second portion of the FRP strand into a second concrete segment such that a third portion of the FRP strand extends from the first concrete segment to the second concrete segment. The method 800 also includes displacing 808 at least one of the first concrete segment and the second concrete segment relative to the other such that a tension is applied to the third portion of the FRP strand.

The methods and systems described herein facilitate providing a non-corrosive reinforcement for a tower such that the tower can be fabricated with a reduced thickness (e.g., a smaller layer of concrete surrounding the reinforcement), thereby decreasing an overall weight of the tower (and the individual tower sections) and enabling easier transportation of the tower to an erection site. Additionally, the methods and systems described herein facilitate strengthening the tower despite the reduced thickness (e.g., the methods and systems described herein facilitate increasing fatigue strength and tensile strength of the tower, which may facilitate decreasing a diameter of the tower proximate the nacelle).

Exemplary embodiments of a wind turbine tower and systems and methods for fabricating or making the same are described above in detail. The methods and systems described herein are not limited to the specific embodiments described herein, but rather, components of the systems and/or steps of the methods may be utilized independently and separately from other components and/or steps described herein. For example, the methods and systems described herein may have other applications not limited to practice with wind turbines, as described herein. Rather, the methods and systems described herein can be implemented and utilized in connection with various other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine tower including a plurality of tower sections, at least one of said tower sections comprising:
a first concrete flange;
a second concrete flange formed separately from said first concrete flange;
a concrete wall formed separately from said first concrete flange and said second concrete flange, said concrete wall positioned between said first concrete flange and said second concrete flange; and
a fiber reinforced plastic ("FRP") strand comprising a first portion embedded in said first concrete flange and having a first tension, a second portion embedded in said second concrete flange and having a second tension, and a third portion embedded in said concrete wall and having a third tension such that said first concrete flange and said second concrete flange are coupled to said concrete wall via said FRP strand, wherein at least one of the following conditions is satisfied: said first portion is directly bonded to said first concrete flange, said second portion is directly bonded to said second concrete flange, and said third portion is directly bonded to said concrete wall.

2. The wind turbine tower in accordance with claim 1, wherein the third tension is different than the first tension and the second tension.

3. The wind turbine tower in accordance with claim 2, wherein the first tension is substantially the same as the second tension.

4. The wind turbine tower in accordance with claim 1, wherein at least one of said first concrete flange and said second concrete flange is fabricated from an ultra-high performance concrete ("UHPC").

5. The wind turbine tower in accordance with claim 4, wherein said concrete wall is fabricated from a concrete material comprising a composition that is different than said UHPC.

* * * * *